United States Patent
Ryshavy et al.

(10) Patent No.: US 9,211,775 B1
(45) Date of Patent: Dec. 15, 2015

(54) ADJUSTABLE SUSPENSION HEIGHT MODIFICATION APPARATUS

(71) Applicant: Stempf Automotive Industries, Inc., Minnetonka, MN (US)

(72) Inventors: John W. Ryshavy, Wayzata, MN (US); Shawn C. Miller, Milaca, MN (US)

(73) Assignee: Stempf Automotive Industries, Inc., Minnetonka, MN (US)

( * ) Notice: Subject to any disclaimer, the term of this patent is extended or adjusted under 35 U.S.C. 154(b) by 0 days.

(21) Appl. No.: 14/516,737

(22) Filed: Oct. 17, 2014

(51) Int. Cl.
*B60G 17/02* (2006.01)

(52) U.S. Cl.
CPC .................................. *B60G 17/021* (2013.01)

(58) Field of Classification Search
CPC ...................................................... B60G 17/021
See application file for complete search history.

(56) References Cited

U.S. PATENT DOCUMENTS

| | | | |
|---|---|---|---|
| 1,881,227 A | 10/1932 | Jackson | |
| 2,233,627 A | 3/1941 | McDonald | |
| 3,309,107 A | 3/1967 | Chieger | |
| 3,378,250 A | 4/1968 | Milford | |
| 3,578,355 A | 5/1971 | Oeder | |
| 3,586,306 A | 6/1971 | Reece et al. | |
| 3,830,482 A * | 8/1974 | Norris | 267/286 |
| 3,954,257 A | 5/1976 | Keijzer et al. | |
| 4,458,605 A | 7/1984 | Herring, Jr. et al. | |
| 4,505,457 A | 3/1985 | Okada et al. | |
| 4,585,211 A | 4/1986 | Griffin | |
| 4,647,069 A | 3/1987 | Iijima | |
| 4,721,325 A | 1/1988 | Mackoviak et al. | |
| 5,080,388 A | 1/1992 | Berry et al. | |
| 5,135,203 A | 8/1992 | Wijnhoven et al. | |
| 5,467,971 A | 11/1995 | Hurtubise et al. | |
| 5,470,049 A | 11/1995 | Wohler et al. | |
| 5,788,262 A | 8/1998 | Dazy et al. | |
| 5,957,651 A | 9/1999 | Takebayashi et al. | |
| 5,967,536 A | 10/1999 | Spivey et al. | |
| 6,053,112 A | 4/2000 | Jones, Jr. | |
| 6,161,822 A | 12/2000 | Hurst et al. | |
| 6,257,601 B1 | 7/2001 | Spears et al. | |
| 6,260,835 B1 | 7/2001 | Angles et al. | |
| 6,273,407 B1 | 8/2001 | Germano | |
| 6,293,572 B1 | 9/2001 | Robbins et al. | |
| 6,328,321 B1 | 12/2001 | Nolan | |
| 6,382,645 B1 | 5/2002 | Gravelle et al. | |
| 6,485,223 B1 | 11/2002 | Van Schmus et al. | |

(Continued)

FOREIGN PATENT DOCUMENTS

| | | |
|---|---|---|
| EP | 566039 | 10/1993 |
| GB | 2075441 | 11/1871 |
| JP | 2004270717 | 9/2004 |

OTHER PUBLICATIONS

Topguncustomz.com, website, All Steel Leveling Spacers, pp. 1-2.

(Continued)

*Primary Examiner* — Ruth Ilan
*Assistant Examiner* — Darlene P Condra
(74) *Attorney, Agent, or Firm* — Haugen Law Firm PLLP

(57) ABSTRACT

A coil spring suspension height modification apparatus includes a frame connection plate securable to a vehicle frame, a coil spring brace plate for locating a coil spring, and an adjustment member for selectively adjusting the axial spacing between the frame connection plate and the coil spring brace plate. The selective axial spacing adjustment correspondingly adjusts the suspension height of the vehicle.

6 Claims, 12 Drawing Sheets

(56) References Cited

U.S. PATENT DOCUMENTS

| | | |
|---|---|---|
| 6,820,883 B2 | 11/2004 | Lang et al. |
| 6,827,184 B1 | 12/2004 | Lin |
| 6,843,352 B2 | 1/2005 | Jacoby et al. |
| 6,923,461 B2 | 8/2005 | Momose et al. |
| 6,957,806 B2 | 10/2005 | Tubbs |
| 6,986,519 B2 | 1/2006 | Smith |
| 7,066,309 B2 | 6/2006 | Colas et al. |
| 7,284,644 B2 | 10/2007 | Cmich et al. |
| 7,311,181 B2 | 12/2007 | Germano et al. |
| 7,513,514 B1 | 4/2009 | Schlosser et al. |
| 7,537,225 B2 | 5/2009 | Ryshavy et al. |
| 7,607,668 B2 | 10/2009 | Dugandzic et al. |
| 7,665,743 B2 | 2/2010 | Poncher et al. |
| 7,717,443 B1 * | 5/2010 | Carlson et al. ......... 280/124.155 |
| 7,780,178 B2 | 8/2010 | Ryshavy et al. |
| 7,850,183 B1 | 12/2010 | Ryshavy et al. |
| 7,976,039 B2 | 7/2011 | Hirve et al. |
| 7,988,166 B2 | 8/2011 | Heeren et al. |
| 8,109,492 B2 | 2/2012 | Winocur |
| 8,196,942 B2 | 6/2012 | Heeren et al. |
| 8,317,210 B1 | 11/2012 | Ryshavy et al. |
| 8,317,211 B1 | 11/2012 | Ryshavy |
| 8,480,108 B2 | 7/2013 | Ryshavy et al. |
| 8,516,672 B2 | 8/2013 | Wohlfarth |
| 8,720,923 B2 | 5/2014 | Ryshavy et al. |
| 8,820,759 B1 * | 9/2014 | Croutcher ................ 280/86.752 |
| 2004/0089990 A1 | 5/2004 | Labeau |
| 2004/0155424 A1 | 8/2004 | Hicks et al. |
| 2005/0017475 A1 | 1/2005 | Hellums |
| 2007/0187919 A1 | 8/2007 | Furman |
| 2008/0303235 A1 * | 12/2008 | Poncher et al. ............ 280/124.1 |
| 2011/0318140 A1 | 12/2011 | Chang |
| 2012/0098215 A1 | 4/2012 | Rositch et al. |

OTHER PUBLICATIONS

Roughcountry.com, website, 2.5 in GM Leveling Lift Kit, pp. 1-2.

* cited by examiner

ADJUSTABLE SUSPENSION HEIGHT MODIFICATION APPARATUS

FIELD OF THE INVENTION

The present invention relates to automotive suspension systems generally, and more particularly to apparatus and methods for adjustably modifying automotive suspension ride height.

BACKGROUND OF THE INVENTION

Automotive suspension systems in use today incorporate a variety of arrangements to best suit the intended applications. A common automotive suspension arrangement includes a coil spring mounted between an axle supporting the wheel assemblies, and the vehicle frame, so as to insulate movement of the wheel assembly from the vehicle frame. In some instances, vehicle owners wish to modify the height of the vehicle frame with respect to its wheels. For example, certain vehicles, such as light-duty trucks, are originally equipped with a suspension that elevates the rear of the vehicle to a greater extent than the front, so as to accommodate for a level vehicle upon loads being placed at the rear end of the vehicle. In such arrangements, some vehicle owners wish to "pre-level" the suspension by raising the front of the vehicle frame to match the extent of vehicle lift provided by the manufacturer at the rear. Such raising of the front suspension of a vehicle is commonly referred to as "suspension leveling". Other applications for raising the suspension height of a vehicle include vehicle owners who simply wish to raise the height of the vehicle frame relative to the wheels for ground clearance or aesthetic purposes.

Devices for effectuating such suspension height modification include static spacers of fixed dimension that are typically placed between the top of the spring and the vehicle frame at the point of connection therebetween. Other suspension height increasing solutions involve fixed dimension spacers disposed between individual coils of the coil spring. In either case, the extent of the suspension height increase is predetermined by the dimension of the static spacer utilized. In many instances, the effect on vehicle ride quality due to suspension height extension is unpredictable. As a result, suspension height modifications are many times repeated in order to achieve a desired balance between suspension height and vehicle ride quality. Since the procedure for installation or removal of conventional suspension spacers is relatively time consuming, and therefore expensive, a need exists in the art for a suspension height adjustment mechanism that enables suspension height modification while in an installed condition on the vehicle suspension. There is a further need in the art to provide a vehicle suspension adjustment mechanism that can provide for a wide range of suspension height modification through a single device. It is envisioned that the apparatus of the present invention meets the needs in the art identified above.

SUMMARY OF THE INVENTION

By means of the present invention, suspension height of a vehicle may be adjustably modified, wherein an extent of suspension height increase may be selectively adjusted in an efficient manner without suspension component disassembly. Such selective adjustment may in fact be accomplished while the suspension height adjustment apparatus, as well as its coordinating suspension componentry, remain in an installed condition.

In a particular embodiment, a coil spring suspension height modification apparatus of the present invention includes a frame connection plate that is securable to a spring housing of a vehicle frame, wherein the frame connection plate has a mounting portion extending as a flange circumaxially outwardly from an annular adjustment member engagement portion for operable placement in juxtaposition with the spring housing. The adjustment member engagement portion includes an inner annular surface annularly arranged about the axis and defines a first channel, and further includes a first threaded portion.

The apparatus further includes an adjustment member having a first engagement portion that is threadably engageable with the first threaded portion of the adjustment member engagement portion. Relative rotation of the adjustment member and the adjustment member engagement portion, when threadably engaged, causes the adjustment member to move axially in the first channel with respect to the frame connection plate. A second engagement portion extends axially from a bearing surface of the adjustment member, and includes an axial feature that is configured for working coordination with a first drive tool.

The apparatus has a coil spring brace plate that is positionable circumaxially about the first engagement portion of the adjustment member, with the coil spring brace plate including a shield portion forming an annular wall extending axially from a brace portion of the coil spring brace plate to define an outer perimeter boundary to an inner brace surface of the brace portion. The annular wall terminates at an outer lip, with a first height being defined between the inner brace surface and the outer lip.

The apparatus further includes a jam nut for securing the coil spring brace plate to the bearing surface of the adjustment member. The jam nut has a first portion specifically configured for working coordination with a second drive tool, and a cap portion for threadable engagement with the second engagement portion of the adjustment member to an extent to be contactable with the inner brace surface. The cap portion exhibits a second height that is greater than the first height. The jam nut also has a second channel that extends axially therethrough to define an access aperture at the first portion, wherein the access aperture and the second channel have a circumaxial dimension that is sufficient to permit passage of the first drive tool therethrough to the axial feature of the second engagement portion of the adjustment member.

In another embodiment, a method for modifying a coil spring suspension height includes installing the apparatus described above by securing the frame connection plate to the spring housing of a vehicle frame and positioning a coil spring between a wheel assembly and the coil spring brace plate so that a first end of the coil spring applies an axially expansive spring force to coil spring brace plate. The coil spring is secured about the shield portion to properly position the spring with respect to the adjustment apparatus.

The jam nut is then loosened said from bearing contact with the inner brace surface, and a tool is inserted through the access aperture of said jam nut to engage with the axial feature of the second engagement portion of the adjustment member. The tool is then operated to rotate the adjustment member to an extent sufficient to axially move the adjustment member with respect to the frame connection plate by a determined amount. The jam nut is then counter-rotated to tighten the jam nut into bearing contact with the inner brace surface, to an extent that rotationally locks the adjustment member with respect to the frame connection plate.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various embodiments of the invention. Other embodiments and aspects of the invention are recognized as being within the grasp of those having ordinary skill in the art.

Figure 1:
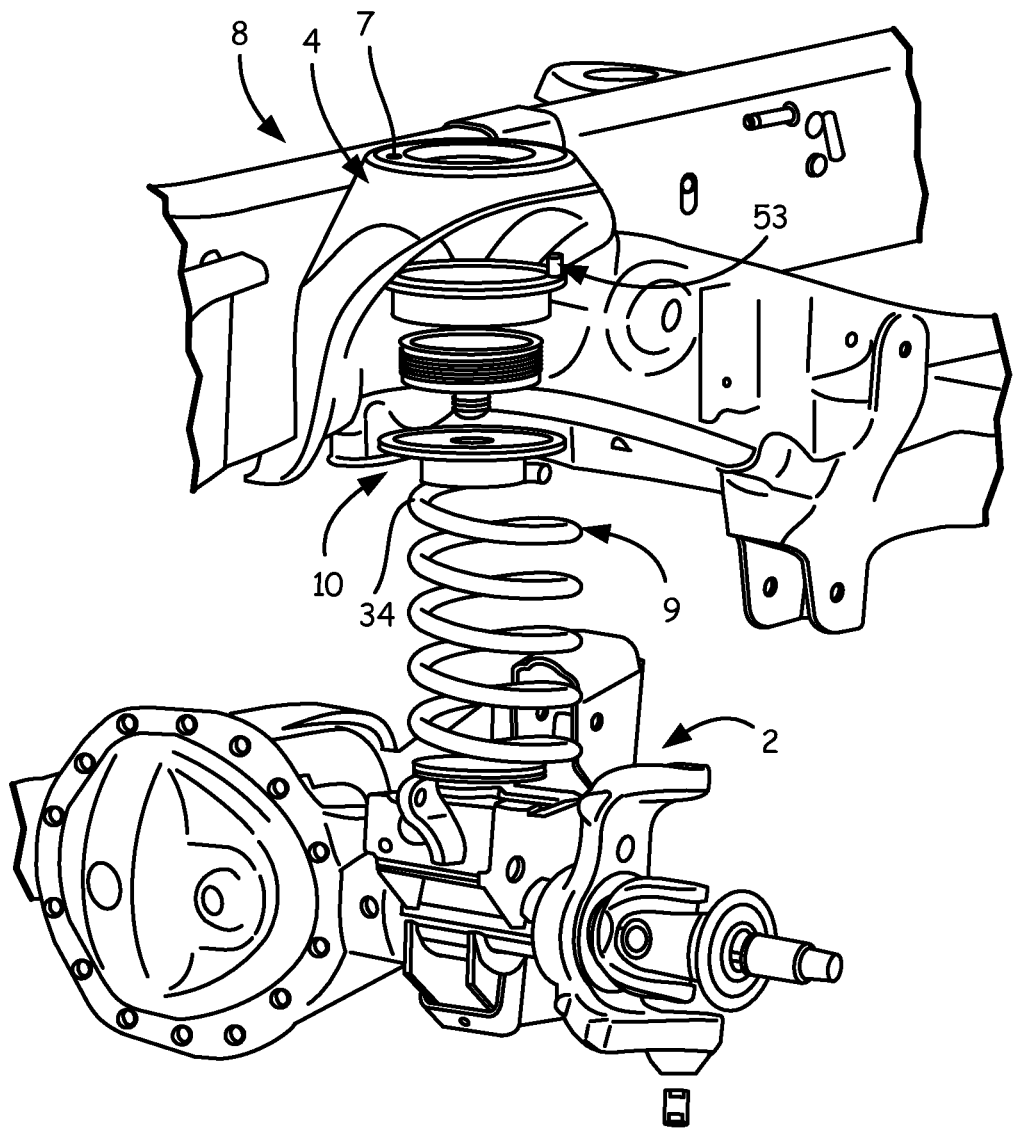
FIG. 1 is an exploded schematic view of a coil spring suspension height modification apparatus in its operational position in a vehicle suspension.

With reference now to the drawings, and first to FIG. 1, a coil spring suspension adjustment apparatus 10 is illustrated in an exploded diagram in its typical operational arrangement between a spring housing 4 of vehicle frame 8 and a vehicle coil spring 9. Through such an arrangement, apparatus 10 may act as a spacer between upper end 34 of coil spring 9 and the associated spring housing 4 of vehicle frame 8. In some embodiments, apparatus 10 includes a coil spring brace plate 12, a frame connection plate 14, and an inner adjustment member 16, which adjusts any axial separation between plates 12, 14. Such adjustable axial separation of plates 12, 14 effectuates the suspension height modification of apparatus 10 of the present invention.

In operation, frame connection plate 14 may be securable to spring housing 4 with one or more bolts (not shown) passing through one or more apertures 52 and respective aligned apertures 7 in spring housing 4. The bolts may be fixed in place with, for example, appropriately configured nuts to secure frame connection plate 14 to spring housing 4 of vehicle frame 8. In some embodiments, frame connection plate 14 may include a locator element 53 extending from a mounting portion 50 so as to be operably received through a respective aperture 7 in spring housing 4. The reception of locator element 53 through such aperture 7 assists in the axial alignment of frame connection plate 14 with spring housing 4.

Figure 2:
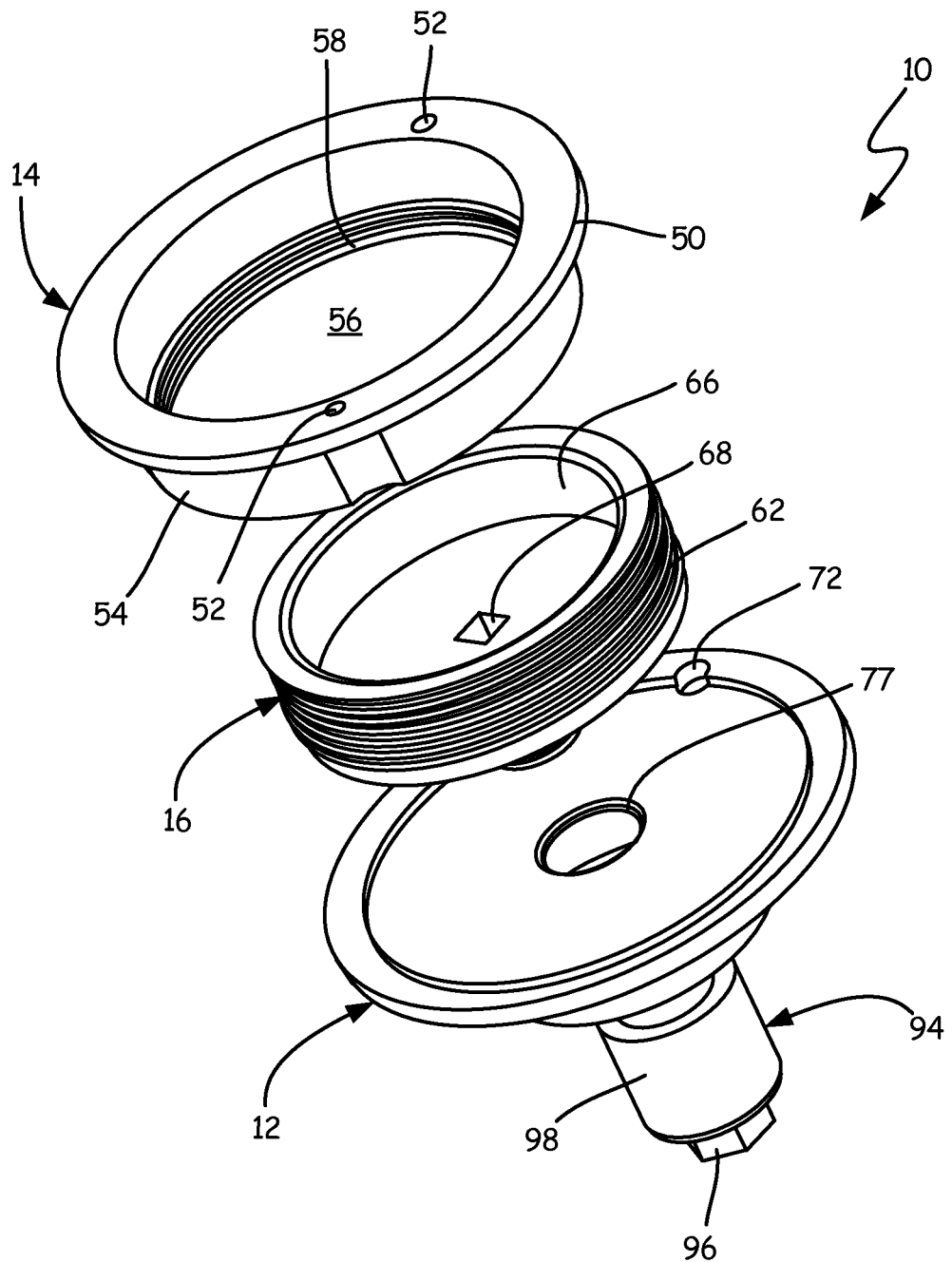
FIG. 2 is a top perspective exploded view of a coil spring suspension height modification apparatus.
Figure 3:
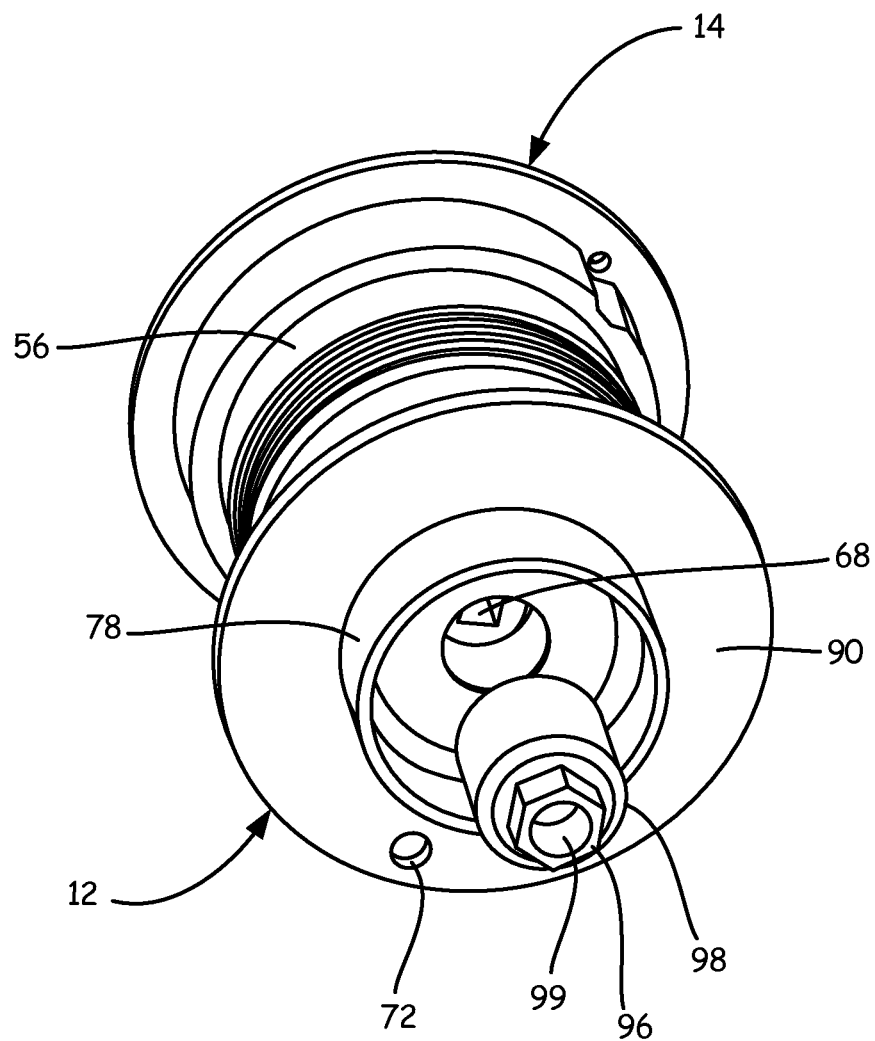
FIG. 3 is a bottom perspective exploded view of a coil spring suspension height modification apparatus.

In the illustrated embodiment, frame connection plate 14 includes a mounting portion 50 and an adjustment member engagement portion 54. Apertures 52 are preferably disposed in mounting portion 50 in a predetermined configuration to permit engagement of mounting bolts therethrough. Adjustment member engagement portion 54 may be disposed about an axial aperture 56 in frame connection plate 14. In the illustrated embodiments, at least a portion of adjustment member engagement portion 54 may be threadably engageable with inner adjustment member 16. An example threaded portion 58 of adjustment member engagement portion 54 is illustrated in FIG. 2.

Inner adjustment member 16 may be a unitary structure having a first engagement portion 62 and a second engagement portion 64. First engagement portion 62 may, for example, be threaded, and may in particular be threaded in a manner to be threadably engageable with threaded portion 58 of frame connection plate 14. Accordingly, in the embodiment illustrated in the drawings, an outer surface of first engagement portion 62 is engageable with adjustment member engagement portion 54 of frame connection plate 14 at axial aperture 56 thereof. In one embodiment, outer diameter $D_1$ is substantially similar to, but slightly smaller than, diameter $D_2$ of axial aperture 56, such that first engagement portion 62 is permitted to engage with adjustment member engagement portion 54 within axial aperture 56.

In some embodiments, adjustment member engagement portion 54 of frame connection plate 14 extends below first plane "A" of mounting portion 50, and may so extend perpendicularly from mounting portion 50. Such extension of adjustment member engagement portion 54 may be provided to accommodate at least a portion of height $H_1$ of first engagement portion 62 within axial aperture 56. In some embodiments, height $H_1$ is less than or equal to height $H_2$ of frame connection plate 14. In this manner, first engagement portion 62 of inner adjustment member 16 is provided with a full engagement height that does not, in operation, require extension below a plane containing upper surface 51 of frame connection plate 14, thereby avoiding interference with spring housing 4.

Inner adjustment member 16 may include a first axial opening 66 in first engagement portion 62, and an axial feature 68 in second engagement portion 64. Axial feature 68 may include an opening which extends axially through at least a portion of second engagement portion 64. In some embodiments, axial feature 68 is configured to receive a projection from a wrench, or other tool, such as a rotation-inducing tool to assist in manipulating inner adjustment member 16 with respect to frame connection plate 14. In the illustrated embodiment, a tool may be utilized to induce rotation of inner adjustment member 16 with respect to frame connection plate 14, which frame connection plate 14 may be maintained in a rotationally stationary orientation with respect to inner adjustment member 16 through the engagement to spring housing 4. In the illustrated embodiment, second axial opening 68 has a substantially square cross-section to operably receive a square-profile socket drive tool, such as a 0.5 inch socket drive. Other cross-section configurations and dimensions for axial feature 68, however, are contemplated by the present invention. Moreover, other features, such as projections or the like may be utilized in place of, or in addition to, an opening 68 for selective coupling thereto by a tool.

Figure 4B:
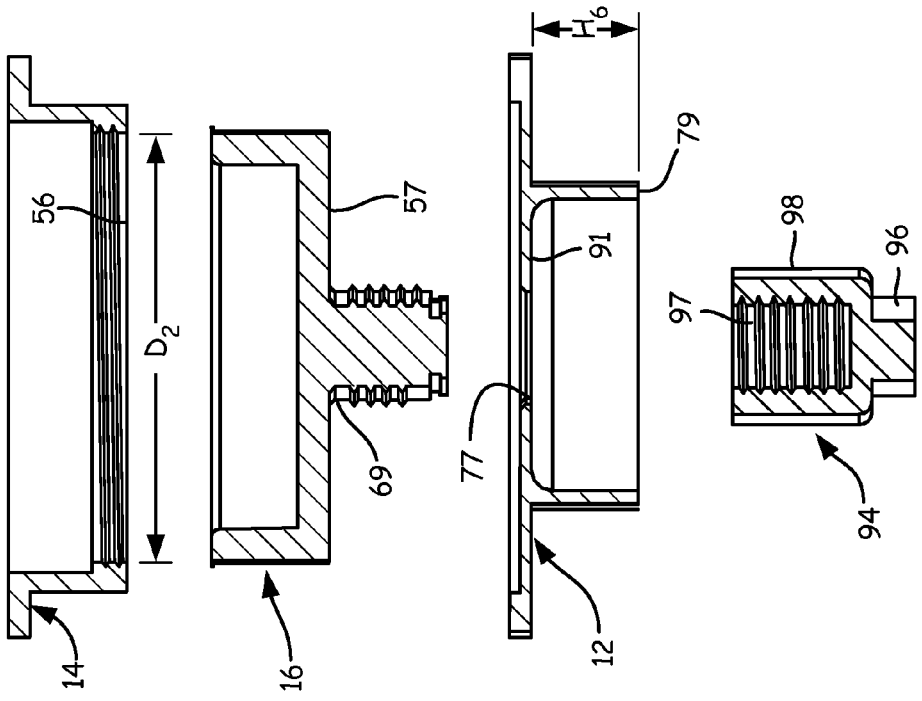
FIG. 4B is a cross-sectional view of the apparatus illustrated in FIG. 4A.
Figure 4A:
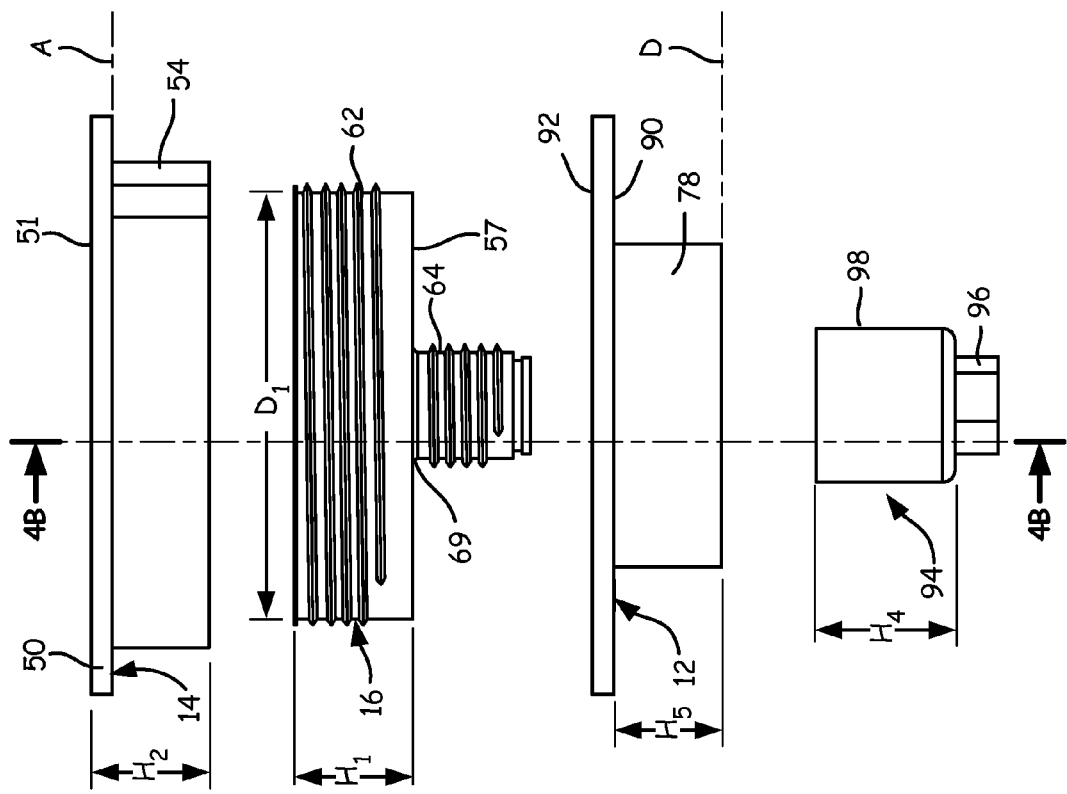
FIG. 4A is an exploded view of a coil spring suspension height modification apparatus.
Figure 5:
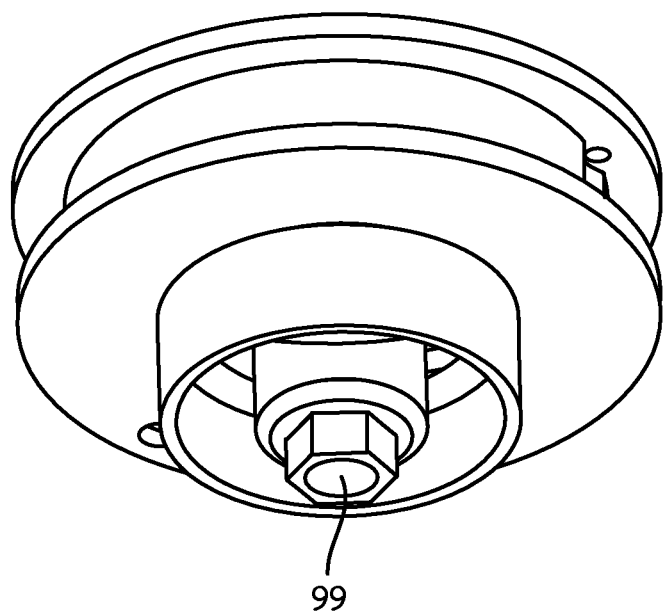
FIG. 5 is a bottom perspective view of a coil spring suspension height modification apparatus.
Figure 6:
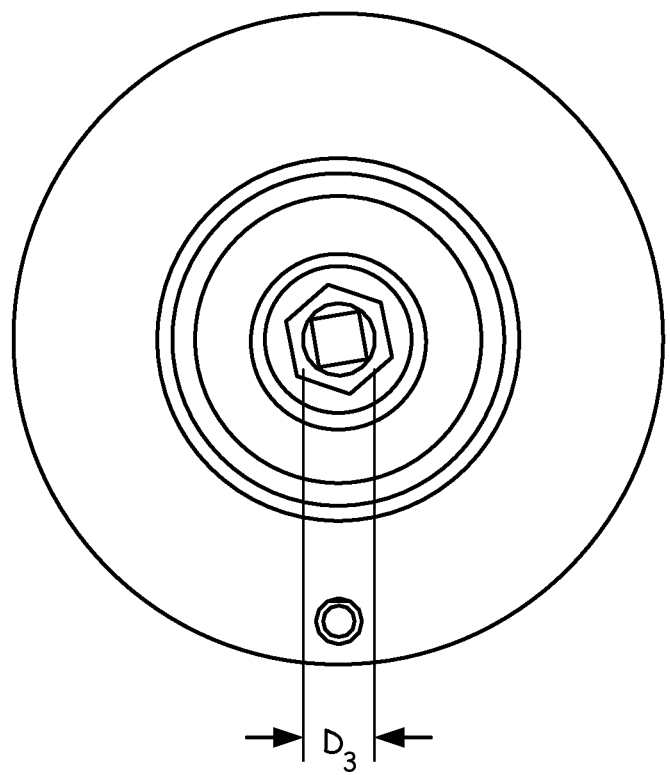
FIG. 6 is a top plan view of a coil spring suspension height modification apparatus.
Figure 7:
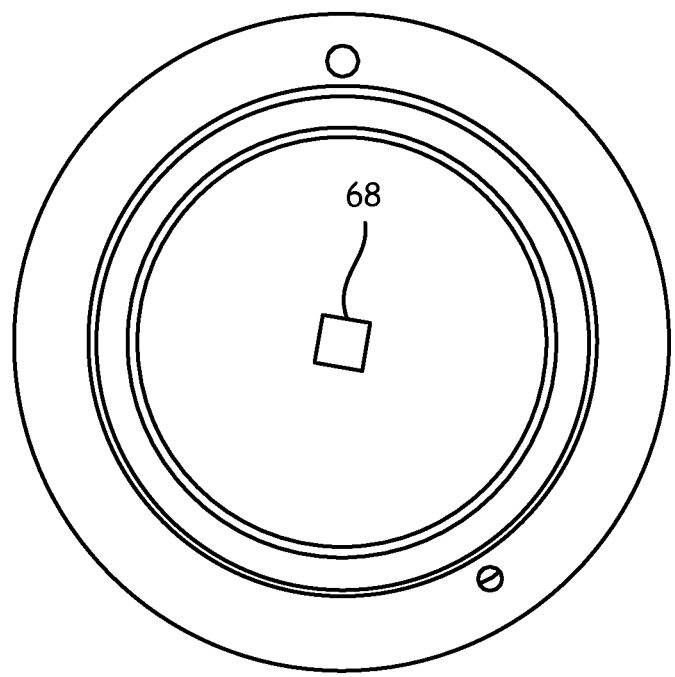
FIG. 7 is a bottom plan view of a coil spring suspension height modification apparatus.
Figure 8:
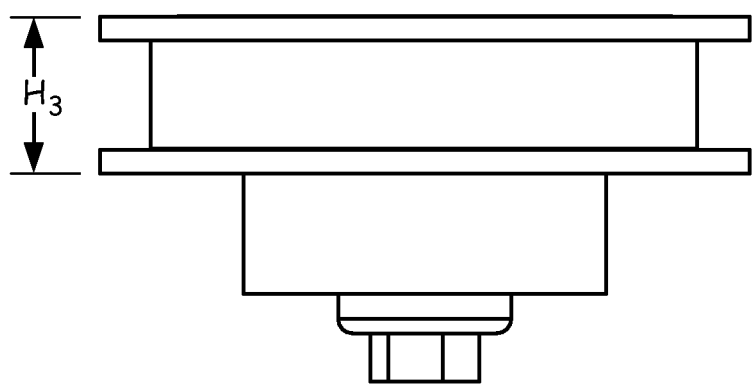
FIG. 8 is a front elevational view of a coil spring suspension height modification apparatus.
Figure 9:
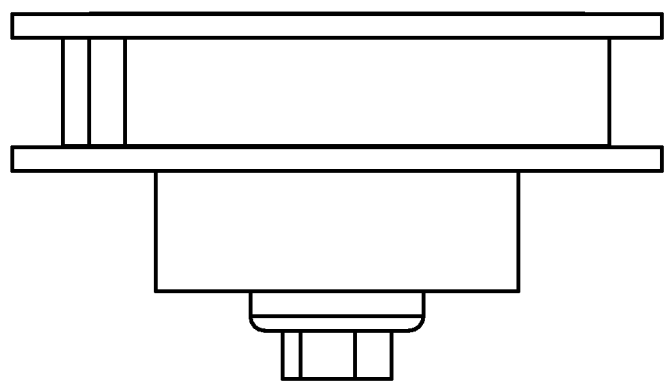
FIG. 9 is a rear elevational view of a coil spring suspension height modification apparatus.
Figure 10:
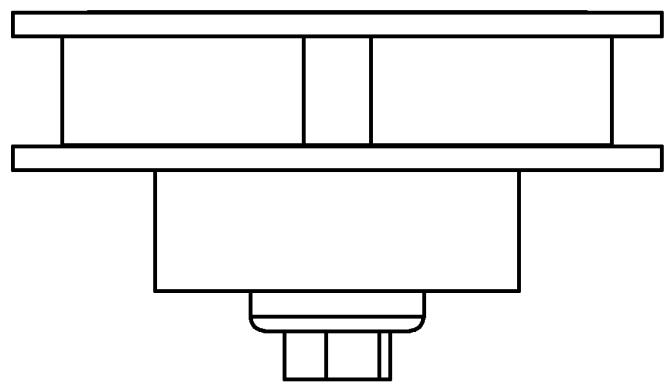
FIG. 10 is a left side elevational view of a coil spring suspension height modification apparatus.
Figure 11:
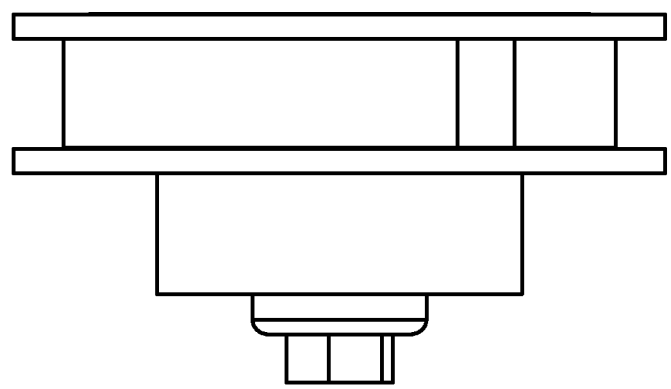
FIG. 11 is a right side elevational view of a coil spring suspension height modification apparatus.
Figure 12:
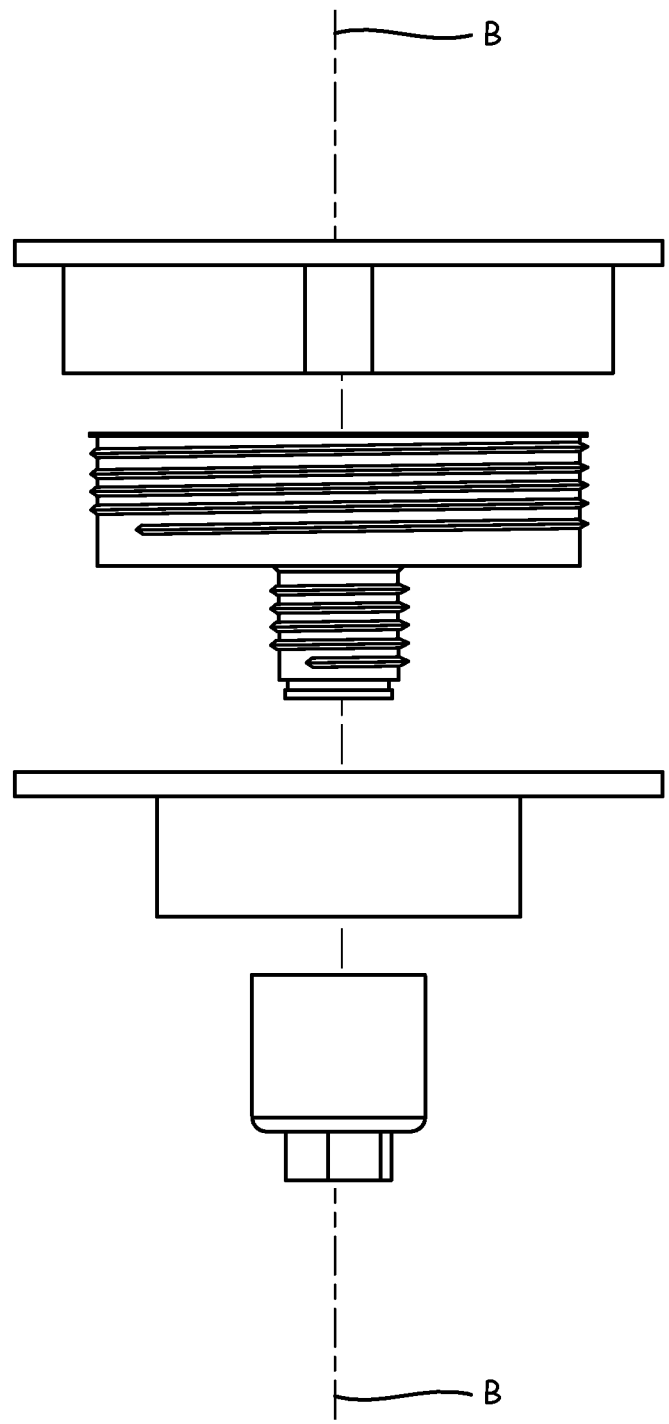
FIG. 12 is a side elevational exploded view of a coil spring suspension height modification apparatus.

In some embodiments, a transition portion 69 is provided on inner adjustment member 16 between first engagement portion 62 and second engagement portion 64. Transition portion 69 may have a tapered profile as illustrated in FIG. 4B to enable rotatable engagement with coil spring brace plate 12. The tapered surface of transition portion 69 assists in minimizing frictional forces created at the junction of inner adjustment member 16 and coil spring brace plate 12, thereby facilitating relative rotational movement therebetween. Such tapered configuration of transition portion 69 further assists in properly seating coil spring brace plate 12 about second engagement portion 64 of inner adjustment member 16.

Though inner adjustment member 16 is described above and depicted in the drawings as being threadably engageable with one or more of plates 12, 14, it is contemplated that other mechanisms of engagement are contemplated. For example, inner adjustment member 16 may be coupled to plates 12, 14, either fixedly or otherwise, and itself be axially extendable along axis "B". Example mechanisms for obtaining axial extendibility of inner adjustment member 16 include worm gears, screw drives, ratchet systems, and the like. Applicants contemplate, therefore, that apparatus 10 may be provided in a variety of combinations, with a common characteristic being that height dimension $H_4$ of apparatus 10 is selectively modifiable. In some embodiments, the selective modification of height dimension $H_3$ may be effectuated while apparatus 10 is in a fully installed condition. In some embodiments, the selective modification of height dimension $H_3$ may be accomplished without disassembly of the coil spring suspension strut assembly, such as removal of coil spring 9 from spring housing 4. Height dimension $H_3$ may be adjusted, for example, from between about 0.5 to about 5 inches.

Coil spring brace plate 12 may include an aperture 72. Coil spring brace plate 12 may be operably positionable upon bearing surface 57 of inner adjustment member 16, and may be seated thereupon at tapered portion 77, which may be in operable juxtaposition with tapered surface 69 of inner adjustment member 16. Because coil spring 9 is operably in compression, its restorative spring force is applied to brace surface 90 of brace portion 92 of coil spring brace plate 12. The restorative spring force acts along central axis "B", and forces coil spring brace plate 12 upon bearing surface 57 of inner adjustment member 16. With frame connection plate 14 secured to spring housing 4 as described above, coil spring brace plate 12 and inner adjustment member 16 may be axially displaced along central axis "B" as a result of axial movement of inner adjustment member 16 with respect to frame connection plate 14. Axial movement of the coil spring brace plate 12/inner adjustment member 16 combination with respect to frame connection plate 14 is effectuated by rotational movement of inner adjustment member 16 with respect to frame connection plate 14. In this manner, the height dimension $H_3$ of apparatus 10 may be selectively modified through the rotation of inner adjustment member 16 with respect to frame connection plate 14, which, due to the helically threaded coupling among inner adjustment member 16 and frame connection plate 14, results in relative axial movement between inner adjustment member 16 and frame connection plate 14. Such relative axial movement acts to adjust the height separation between vehicle frame 8 and the associate vehicle wheel assembly. In the event that height dimension $H_3$ of apparatus 10 is selectively increased through the operation described above, frame connection plate 14 transmits force to spring housing 4 of vehicle frame 8 to effectuate a desired degree of raising thereof relative to the associated vehicle wheel assembly 2.

In some embodiments of apparatus 10, a shield portion 78 extends outwardly from plane "C" of coil spring brace plate 12, and preferably perpendicularly outwardly therefrom. In operation, shield portion 78 depends downwardly from brace portion 92 of coil spring brace plate 12 axially into the open core of coil spring 9. In such a manner, shield portion 78 acts as a locater feature for positioning coil spring 9 against brace portion 92 and circumaxially about shield portion 78.

A pass-through jam nut 94 may be provided to selectively lockingly secure the combination of coil spring brace plate 12 and inner adjustment member 16 at a desired axial position relative to frame connection plate 14 along axis B. In one embodiment, jam nut 94 threadably engages with second engagement portion 64 of inner adjustment member 16 to an extent at which jam nut 94 engages, or causes another element to engage, inner bearing surface 91 of coil spring brace plate 12. Such engagement develops a frictional resistance to the rotatability of inner adjustment member 16 relative to frame connection plate 14 by forcing the threads of first engagement portion 62 axially against the threads of threaded portion 58 of frame connection plate 14. The frictional resistance effectively prevents relative rotation among inner adjustment member 16 and frame connection plate 14, and thus arrests change in axial separation between plates 12, 14. In the illustrated embodiment, jam nut 94 includes a hex-head portion 96 and the cap portion 98 for engagement with inner adjustment member 16 and coil spring brace plate 12. Cap portion 98 of jam nut 94 may be threadably received about and engaged with second engagement portion 64 of inner adjustment member 16. In particular, cap portion 98 may be brought into engagement with inner bearing surface 91 of coil spring brace plate 12, as described above. Jam nut 94 may, in some embodiments, comprise a single unitary body, wherein rotation of hex nut portion 96 correspondingly rotates cap portion 98 to threadably rotate with respect to second engagement portion 64 of inner adjustment member 16. Though the illustrated embodiment of jam nut 94 includes a hex-head portion 96 in the general configuration of a hex nut, it is contemplated that other configurations may be employed to engage with a wrench or other appropriate tool for imparting rotation to cap nut 94 about second engagement portion 64 of inner adjustment member 16.

Cap portion 98 may preferably have a height dimension $H_4$ that is equal to or greater than a height dimension $H_5$ of shield portion 78 of coil spring brace plate 12. In such a manner, cap portion 98 may operably be in pressing engagement with inner bearing surface 91 of coil spring brace plate 12 while hex-head portion 96 protrudes beyond a plane "D" transversing in the outermost extent of shield portion 78 at lip 79, so that a wrench or other appropriate tool may easily access hex-head portion 96 of jam nut 94 while cap portion 98 is in operable juxtaposition with inner bearing surface 91. Moreover, hex-head portion 96 preferably includes an axial aperture 99 that communicates with chamber 97 of jam nut 94 to form a continuous axial passageway through jam nut 94. Aperture 99, and the continuous passageway, may preferably be sufficiently large to permit a rotational tool to pass therethrough. An example rotational tool useful in the present invention is a socket drive for engagement with axial opening 68 in second engagement portion 64 of inner adjustment member 16. A particular example rotational tool useful to engage with axial opening 68, as described above, is a 0.5 inch square cross-section socket drive. In such embodiments, a diameter $D_3$ of aperture 99 may be between about 0.7 and 2.5 inches, and more preferably between about 0.75 and 1 inch.

Due to the high loads and stresses that may be placed upon apparatus 10 in operation, it is desired that apparatus 10 be manufactured of strong and durable materials, such as, for example, stainless steel or high-nickel steel. Other materials, however, may be utilized in the fabrication of apparatus 10, so long as such materials exhibit adequate strength and durability properties desired by the end user and/or by the manufacturer.

Apparatus 10 of the present invention, as described above, provides selective adjustment of suspension height (as defined between vehicle frame 8 and the associated vehicle wheel assemblies 2) while apparatus 10 is in a mounted, operating condition, such as, for example, between coil spring 9 and vehicle frame 8. Moreover, such selective adjustment may take place without disassembly of coil spring 9 from spring housing 4. In some embodiments, the selective adjustment may enable a range of up to about 5 inches of added suspension height. Such a range, however, may be modified as desired per application. In particular, certain embodiments of apparatus 10 may provide more or less suspension height adjustment than described above.

In one embodiment, apparatus 10 may be mounted to a vehicle by first removing coil spring 9 from its connection to the vehicle frame at spring housing 4. Frame connection plate 14 is then secured to spring housing 4 of vehicle frame 8, as described above. Inner adjustment member 16 is then threadably engaged within adjustment member engagement portion 54 of frame connection plate 14 to a desired extent of suspension height adjustment. Coil spring base plate 12 is then mounted about second engagement portion 64 of inner adjustment member 16 for positioning upon bearing surface 57 of inner adjustment member 16. Jam nut 94 is then threadably engaged with second engagement portion 64 of inner adjustment member 16 to an extent at which cap portion 98 abuts inner brace surface 91 of coil spring brace plate 12, and presses coil spring brace plate 12 against bearing surface 57 of inner adjustment member 16 to rotationally lock inner adjustment member 16 with respect to frame connection plate 14. Once both frame connection plate 12 and coil spring brace plate 12 are secured in place, coil spring 9 may be installed about shield portion 78 of coil spring brace portion, and adjustment to the extent desired of suspension height modification may be made by coupling a drive socket wrench or other appropriate tool to second axial opening 68 of inner adjustment member 16 through jam nut aperture 99. In such a manner, second axial opening 68 is accessible to a drive socket wrench or other tool while apparatus 10 is in an installed condition, such that suspension height adjustment may be accomplished without having to remove apparatus 10 from its securely mounted condition. Accordingly, in order to effectuate suspension height adjustment while apparatus 10 is in an installed condition, an operator need only loosen jam nut 94 with an appropriate tool, and then rotate inner adjustment member 16 in an appropriate direction through manipulation of a tool coupled to inner adjustment member 16 at an actuation feature such as second axial opening 68. The adjustment technique described above, therefore, substantially reduces time and expense in adjusting, or re-adjusting suspension height once apparatus 10 has been installed. As described above, conventional devices require removal and re-installation of the entire coil spring assembly and spacer device in order to effectuate a modification of suspension height adjustment. Apparatus 10 of the present invention eliminates such a necessity.

An important purpose of apparatus 10 is to effectuate adjustable vehicle suspension height modification by adjustably "adding to" the height dimension of a coil spring. For the purposes of this application, the term "wheel assemblies" is intended to include the structure associated with the connection of a wheel to a vehicle, and specifically includes, but is not limited to, axles, steering rods, lower control arms, and the like.

It is another aspect of the present invention that apparatus 10 be useful in connection with original suspension equipment supplied with the vehicle from the manufacturer. Though apparatus 10 may additionally be useful in aftermarket products, it is specifically envisioned that apparatus 10 be adaptable to original vehicle equipment. For example, apparatus 10 may be specifically configured to be operably connectable to the coil spring assembly originally supplied with a particular make, model, and model year automobile. In this manner, apparatus 10 may represent merely an "add-on" device that may be installed on a vehicle without need for replacement or modification of existing vehicle parts.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different methods/devices and that various modifications can be accomplished without departing from the scope of the invention itself.

What is claimed is:

1. A coil spring suspension height modification apparatus having an axis and comprising:
    a frame connection plate securable to a spring housing of a vehicle frame, said frame connection plate having a mounting portion extending as a flange circumaxially outwardly from an annular adjustment member engagement portion for operable placement in juxtaposition with the spring housing, wherein said adjustment member engagement portion includes an inner annular surface annularly arranged about said axis and defining a first channel and including a first threaded portion;
    an adjustment member having a first engagement portion that is threadably engageable with said first threaded portion of said adjustment member engagement portion, wherein relative rotation of said adjustment member and said adjustment member engagement portion, when threadably engaged, causes said adjustment member to move axially in said first channel with respect to said frame connection plate, and a second engagement portion extending axially from a bearing surface of said adjustment member and having an axial feature that is configured for working coordination with a first drive tool;
    a coil spring brace plate positionable circumaxially about said first engagement portion of said adjustment member, said coil spring brace plate including a shield portion forming an annular wall extending axially from a brace portion of said coil spring brace plate to define an outer perimeter boundary to an inner brace surface of said brace portion, said annular wall terminating at an outer lip with a first height being defined between said inner brace surface and said outer lip; and
    a jam nut for securing said coil spring brace plate to said bearing surface of said adjustment member, said jam nut having a first portion specifically configured for working coordination with a second drive tool, and a cap portion for threadable engagement with said second engagement portion of said adjustment member to an extent to be contactable with said inner brace surface, said cap portion having a second height that is greater than said first height, said jam nut having a second channel extending axially therethrough to define an access aperture at said first portion, wherein said access aperture and said second channel have a circumaxial dimension that is sufficient to permit passage of said first drive tool therethrough to said axial feature of said second engagement portion of said adjustment member.

2. A coil spring suspension height modification apparatus as in claim 1, including a locater element extending from said mounting portion of said frame connection plate for engagement within and aperture of the spring housing.

3. A coil spring suspension height modification apparatus as in claim 1 wherein said axial feature of said second engagement portion of said adjustment member is configured to receive a socket drive tool.

4. A coil spring suspension height modification apparatus as in claim 1 wherein said shield portion is arranged to locate a coil spring at said bearing surface of said coil spring brace plate.

5. A coil spring suspension height modification apparatus as in claim 1 wherein said first portion of said jam nut is configured as a hex-head nut for working cooperation with a wrench.

6. A method for modifying a coil spring suspension height, comprising:

installing the apparatus of claim 1 by securing said frame connection plate to a spring housing of a vehicle frame;

positioning a coil spring between a wheel assembly and said coil spring brace plate, with a first end of the coil spring applying an axially expansive spring force to said coil spring brace plate, and secured about said shield portion;

rotating said jam nut to loosen said jam nut from bearing contact with said inner brace surface;

inserting a tool through said access aperture of said jam nut to engage with said axial feature of said second engagement portion of said adjustment member;

operating the tool to rotate said adjustment member to an extent sufficient to axially move said adjustment member with respect to said frame connection plate by a determined amount; and counter-rotating said jam nut to tighten said jam nut into bearing contact with said inner brace surface, to an extent that rotationally locks said adjustment member with respect to said frame connection plate.

\* \* \* \* \*